United States Patent
Lee et al.

(10) Patent No.: US 8,250,222 B2
(45) Date of Patent: Aug. 21, 2012

(54) METHOD AND APPARATUS FOR INTEGRATING COMMUNICATION SESSIONS SUPPORTING AUDIO AND VIDEO BETWEEN ENTITIES

(75) Inventors: Seung-Yong Lee, Seoul (KR); Sung-Jin Park, Suwon-si (KR); Kyung-Tak Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 162 days.

(21) Appl. No.: 12/550,792

(22) Filed: Aug. 31, 2009

(65) Prior Publication Data

US 2010/0057920 A1   Mar. 4, 2010

(30) Foreign Application Priority Data

Aug. 29, 2008 (KR) .................. 10-2008-0085167

(51) Int. Cl.
*G06F 15/16* (2006.01)

(52) U.S. Cl. ......... 709/228; 709/202; 709/203; 709/227

(58) Field of Classification Search .......... 709/202–203, 709/227–229

See application file for complete search history.

(56) References Cited

U.S. PATENT DOCUMENTS

| | | | |
|---|---|---|---|
| 7,840,681 B2 * | 11/2010 | Acharya et al. | 709/227 |
| 7,872,994 B2 * | 1/2011 | Garg et al. | 370/260 |
| 2003/0125023 A1 | 7/2003 | Fishler | |
| 2005/0160160 A1 | 7/2005 | Wang | |
| 2006/0026288 A1 * | 2/2006 | Acharya et al. | 709/227 |
| 2007/0115806 A1 * | 5/2007 | Onorato et al. | 370/219 |
| 2008/0114881 A1 | 5/2008 | Lee et al. | |
| 2009/0193131 A1 * | 7/2009 | Shi | 709/229 |
| 2009/0327428 A1 * | 12/2009 | Ramanathan et al. | 709/206 |

FOREIGN PATENT DOCUMENTS

| | | |
|---|---|---|
| KR | 1020030022123 | 3/2003 |
| KR | 1020050069892 | 7/2005 |
| KR | 1020080043134 | 5/2008 |
| WO | WO 2006/010526 | 2/2006 |

OTHER PUBLICATIONS

J. Rosenberg et al., "SIP: Session Initiation Protocol", RFC: 3261, Network Working Group, Standards Track, Jun. 2002.
R. Sparks, "The Session Initiation Protocol (SIP) Refer Method", Network Working Group, Standards Track, Apr. 2003.
R. Mahy et al., "The Session Initiation Protocol SIP) "Replaces" Header", Network Working Group, Standards Track, Sep. 2004.

* cited by examiner

*Primary Examiner* — Bharat N Barot
(74) *Attorney, Agent, or Firm* — The Farrell Law Firm, P.C.

(57) ABSTRACT

A session integration method is provided for integrating a first session between a first entity and a third entity and a second session between a second entity and the third entity in a session-based service environment. The first entity receives a REFER message including dialog information from the second entity, and sends a response message to the received REFER message to the second entity. When header information included in the received REFER message indicates an INVITE message and the dialog information is related to the first entity, the first entity generates a Re-INVITE message and sends the generated Re-INVITE message to an address of a target which is subject to session integration. The address is included in the header information and corresponds to the third entity. The first entity updates the first session into an integrated session with the third entity.

20 Claims, 8 Drawing Sheets

METHOD AND APPARATUS FOR INTEGRATING COMMUNICATION SESSIONS SUPPORTING AUDIO AND VIDEO BETWEEN ENTITIES

PRIORITY

This application claims priority under 35 U.S.C. §119(a) to a Korean Patent Application filed in the Korean Intellectual Property Office on Aug. 29, 2008 and assigned Serial No. 10-2008-0085167, the entire disclosure of which is incorporated herein by reference.

BACKGROUND OF THE INVENTION

1. Field of the Invention

The present invention relates generally to a method and system for establishing, changing and closing Session Initiation Protocol (SIP) sessions between SIP User Agents (UAs) in an SIP-based service environment. More particularly, the present invention relates to a method and system for integrating a session in progress on an SIP UA into a different independent session in progress on another SIP UA in an SIP-based service environment.

2. Description of the Related Art

In a conventional SIP-based service environment, if a session in progress on a second SIP UA is integrated into a different independent session in progress on a first SIP UA, the session in progress on the second SIP UA is closed and the session in progress on the first SIP UA is updated to include the session in progress on the second SIP UA.

This integrating operation may be performed by a session integration request from the first SIP UA, or a session integration request from the second SIP UA. The method of integrating sessions at the request of the first SIP UA may be embodied by the conventional SIP signaling.

FIG. 1 is a diagram illustrating a conventional process of integrating sessions at the request of a first SIP UA. Only those components necessary for the process of integrating sessions between SIP UAs are shown in FIG. 1. An SIP/IP core network in an SIP-based service environment is excluded. In the SIP-based service environment, the SIP/IP core network provides a basic framework for transmitting and receiving all SIP requests and SIP responses between SIP entities. However, FIG. 1 focuses on interactions and operations between the SIP UAs and an SIP server.

It is assumed in FIG. 1 that first and second SIP UAs belong to a user A and a third SIP UA belongs to another user B. Also, it is assumed that user A and user B exchange audio and video with each other. User B transmits/receives both audio and video with the third SIP UA, while user A transmits/receives only audio with the first SIP UA and only video with the second SIP UA. For that purpose, user B establishes one SIP session supporting both audio and video between the third SIP UA and the SIP server, and user A establishes an audio session between the first SIP UA and the SIP server and a video session between the second SIP UA and the SIP server.

Based on the assumptions described above, with reference to FIG. 1, a description is provided of a process of integrating the video session in progress on the second SIP UA into the audio session in progress on the first SIP UA at the request of the first SIP UA.

Referring to FIG. 1, in step 101, the first SIP UA sends an update request for the audio session to the SIP server in order to integrate the audio session established to the SIP server and the video session between the second SIP UA and the SIP server. To request update of the audio session, the first SIP UA sends a Re-request message (hereinafter referred to as a "Re-INVITE message") to the SIP server. Since the updated session should support both audio and video, the Re-INVITE message includes Session Description Protocol (SDP) bodies for the audio and the video. In addition, the Re-INVITE message includes a Replaces header in order to release the video session in progress between the second SIP UA and the SIP server after the audio session is updated between the first SIP UA and the SIP server. The Replaces header has a dialog-id that is generated when the video session is established between the second SIP UA and the SIP server. The dialog is shared by two SIP UAs by exchanging SIP messages with each other, and each dialog-id has call-id, from-tag and to-tag, which are commonly included in SIP messages exchanged to create the dialog.

In step 103, upon receipt of the Re-INVITE message, the SIP server sends an Accept Response message (hereinafter referred to as a "200 OK message") to the first SIP UA in response to the received Re-INVITE message. In step 105, if the first SIP UA receives the 200 OK message, the audio session between the first SIP UA and the SIP server is updated into an audio-video integrated session at the request of the first SIP UA.

In step 107, the SIP server sends a Close message (hereinafter referred to as a "BYE message") to the second SIP UA in order to close the dialog indicated by the Replaces header included in the received Re-INVITE message. If the second SIP UA sends a 200 OK message to the SIP server in response to the BYE message in step 109, the video session between the second SIP UA and the SIP server is released in step 111.

Conventionally, when there is an intention to integrate SIP sessions in progress on different SIP UAs into a single SIP session, the first SIP UA should send a Re-INVITE message with a Replaces header to the SIP server. In the conventional technology, because the session integration request is equivalent to a session update request, an SIP UA requesting session integration is also identical to an SIP UA requesting session update.

However, even when the second SIP UA requests the session integration, a session update request must be made by the first SIP UA joining the relevant session. Specifically, even if the second SIP UA requests the session integration, a session update request from the first SIP UA to the SIP server should be made. SIP defines a REFER message in order to enable a recipient of the REFER message to send an INVITE message to the other SIP UA. However, the SIP UA, which received the REFER message, can generate and send a new INVITE message based on the REFER message, but cannot generate a Re-INVITE message.

SUMMARY OF THE INVENTION

The present invention has been made to address at least the above problems and/or disadvantages and to provide at least the advantages described below. Accordingly, an aspect of the present invention provides a method and system for integrating different independent SIP sessions between different SIP entities in an SIP-based service environment.

Another aspect of the present invention provides a method and system for integrating sessions at the request of an SIP entity joining an SIP session moving to the other SIP entity in order to integrate different independent SIP sessions between different SIP entities in an SIP-based service environment.

According to one aspect of the present invention, a session integration method is provided for integrating a first session between a first entity and a third entity and a second session between a second entity and the third entity in a session-based service environment. A REFER message including dialog information from the second entity is received by the first entity. A response message to the received REFER message is sent to the second entity by the first entity. A Re-INVITE message is generated by the first entity when header information included in the received REFER message indicates an INVITE message and the dialog information is related to the first entity. The generated Re-INVITE message is sent by the first entity to an address of a target which is subject to session integration. The address is included in the header information and corresponds to the third entity. The first session is updated by the first entity into an integrated session with the third entity.

According to another aspect of the present invention, a session integration apparatus of a first entity is provided in a system for integrating a first session between the first entity and a third entity and a second session between a second entity and the third entity in a session-based service environment. The apparatus includes means for receiving a REFER message including dialog information and sending a response message to the received REFER message to the second entity. The apparatus also includes means for generating a Re-INVITE message and sending the generated Re-INVITE message to a target address included in header information of the REFER message, when the header information indicates an INVITE message and the dialog information included in the header information is related to the first entity.

According to another aspect of the present invention, a session integration method is provided for integrating a first session between a first entity and a third entity and a second session between a second entity and the third entity in a session-based service environment. The method includes sending, by the second entity, a REFER message including dialog information to the first entity through the third entity; receiving, by the second entity, a response message to the REFER message from the first entity through the third entity; receiving, by the second entity, BYE message for close the dialog from the third entity when the second session is integrated into the first session; and sending, by the second entity, a response message to BYE message to the third entity for release of the second session.

According to another aspect of the present invention, a session integration apparatus of a second entity is provided in a system for integrating a first session between a first entity and a third entity and the second session between a second entity and the third entity in a session-based service environment. The apparatus includes means for sending a REFER message including dialog information to the first entity through the third entity and sending a response message to BYE message to the third entity for release of the second session; and means for receiving a response message to the REFER message from the first entity through the third entity and receiving BYE message for close the dialog from the third entity when the second session is integrated into the first session

BRIEF DESCRIPTION OF THE DRAWINGS

The above and other aspects, features and advantages of the present invention will be more apparent from the following description when taken in conjunction with the accompanying drawings, in which.

DETAILED DESCRIPTION OF EMBODIMENTS OF THE PRESENT INVENTION

Figure 1:
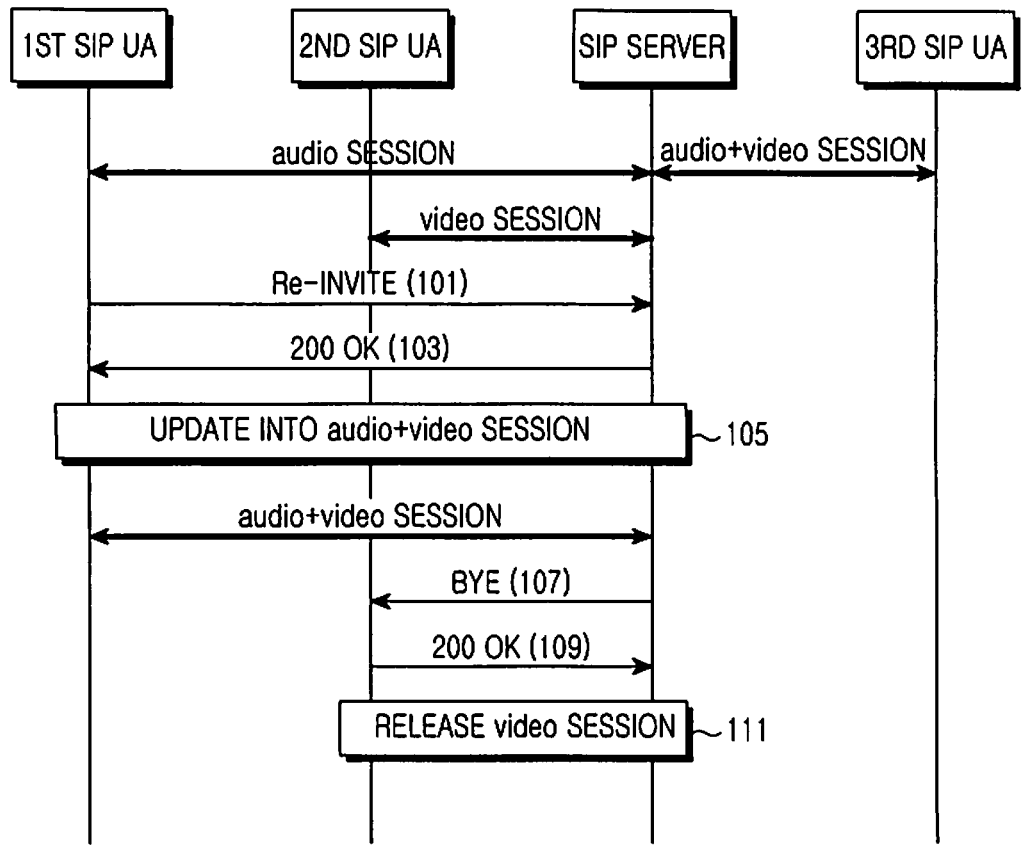
FIG. 1 is a diagram illustrating a conventional process of integrating sessions at the request of a first SIP UA.

Embodiments of the present invention are described in detail with reference to the accompanying drawings. The same or similar components are designated by the same or similar reference numerals although they are illustrated in different drawings. Detailed descriptions of constructions or processes known in the art may be omitted to avoid obscuring the subject matter of the present invention.

Figure 2:
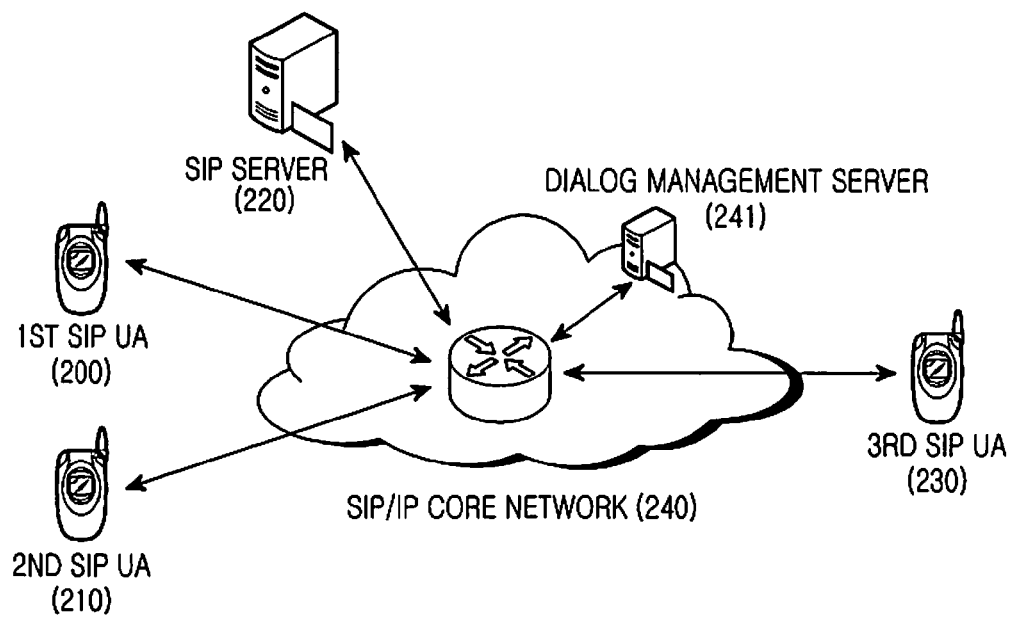
FIG. 2 is a diagram illustrating a network environment for session integration, according to an embodiment of the present invention.

FIG. 2 is a diagram illustrating a network environment for session integration, according to an embodiment of the present invention.

Although a real network environment has many network elements, only those components necessary for operation of an embodiment of the present invention are described and illustrated with reference to FIG. 2.

Referring to FIG. 2, a first SIP UA 200, a second SIP UA 210 and a third SIP UA 230 are SIP entities include means for generating SIP Request messages and SIP Response messages, and means for exchanging the SIP Request messages and SIP Response messages with SIP entities such as the other SIP UAs and an SIP server 220. The first SIP UA 200, the second SIP UA 210 and the third SIP UA 230 can handle SIP Request messages and SIP Response messages that are transmitted and received according to an SIP protocol. Examples of the SIP UA include SIP phones, Push To Talk (PTT) over Cellular (PoC) clients, united messaging clients, etc.

The SIP server 220 interacts with SIP UAs over an SIP/IP core network 240, and can exchange SIP Request messages and SIP Response messages with the SIP UAs. In an embodiment of the present invention, the SIP server 220 is involved in establishing and controlling sessions, is located in a moving path of media, and performs a series of functions related to control of media transmission/reception. Examples of the SIP server 220 include application servers, such as conference servers and united messaging servers, and SIP proxy servers. The SIP/IP core network 240 performs delivers control signals for SIP-based services and messages generated by service users or service entities to recipients or other entities. To perform these functions, the SIP/IP core network 240 should be able to exchange messages even with SIP/IP core networks belonging to other service providers. A dialog management server 241 records and manages in dialog package documents all dialog information generated in each of the SIP entities, such as the SIP UAs 200, 210 and 230 and the SIP server 220. The dialog management server 241 may provide dialog package documents requested by the first SIP UA 200 to the third SIP UA 230.

A method for integrating two different SIP sessions into one session is provided in accordance with an embodiment of the present invention by allowing an SIP entity receiving a REFER message to generate a Re-INVITE message in the above-described network environment for session integration. The embodiment of the present invention describes a method for including, in a Refer-To header of a REFER message, dialog information that an SIP entity receiving the REFER message needs in order to generate a Re-INVITE message. In addition, the embodiment of the present invention discloses a method in which an SIP entity receiving the REFER message analyzes and handles the dialog information included in the Refer-To header.

A description is first provided of a method in which an SIP entity receiving a REFER message includes dialog information in a Refer-To header of the REFER message, according to an embodiment of the present invention.

According to the current the SIP protocol, the Refer-To header cannot include dialog information indicating dialogs. Therefore, an embodiment of the present invention provides different possible methods for extending the Refer-To header so that the Refer-To header may include dialog information. The methods for extending the Refer-To header are described below with reference to Tables 1 through 3.

TABLE 1

Refer-To:
<sip:carol@example.com;method=INVITE;call-id=12345@example.com;
from-tag=abc1234;to-tag=xyz1234>

A first method for extending the Refer-To header, which directly represents dialog information as shown in Table 1, defines Refer-To header parameters including a call-id parameter, a from-tag parameter and a to-tag parameter. The call-id parameter, the from-tag parameter and the to-tag parameter indicate a call-id value, a from-tag value and a to-tag value of a dialog to be represented, respectively. In order to indicate a particular dialog, the call-id, from-tag and to-tag values included in an SIP message, which is exchanged between two SIP UAs to generate the dialog, is specified. The call-id is represented in a Call-ID header of the SIP message, the from-tag is a parameter of a From header, and the to-tag is a parameter of a To header. Accordingly, the dialog can be identified by a combination of the call-id value, the from-tag value and the to-tag value.

TABLE 2

Refer-To:
<sip:carol@example.com;method=INVITE;dialog=12345@example.com,
abc1234,xyz1234>

A second method for extending the Refer-To header, which directly represents dialog information as shown in Table 2, newly defines dialog parameters as Refer-To header parameters. These dialog parameters indicate call-id, from-tag, and to-tag values of a dialog to be represented. The call-id, from-tag, and to-tag values are arranged in predetermined order, and separated by commas.

TABLE 3

Refer-To:
<sip:carol@example.com;method=INVITE;dialog=azx8241>

A third method for extending the Refer-To header, which indirectly represents dialog information as shown in Table 3, newly defines dialog parameters as Refer-To header parameters. The dialog parameters have IDs of dialog elements in a dialog package document (eXtensible Markup Language (XML) document) in which dialog information to be represented is written. The dialog package document is a document in which a variety of information is written in XML, which is related to dialog states from a start point to an end point of a dialog. The dialog elements in the dialog package document include not only the state information of a dialog but also call-id, from-tag, and to-tag values by which a dialog can be identified. Generally, the SIP/IP core network 240 provides the dialog management server 241 in charge of managing dialog package documents.

A description is provided below of a method in which an SIP entity receiving a REFER message handles the dialog information included in the Refer-To header, according to an embodiment of the present invention.

Figure 3:
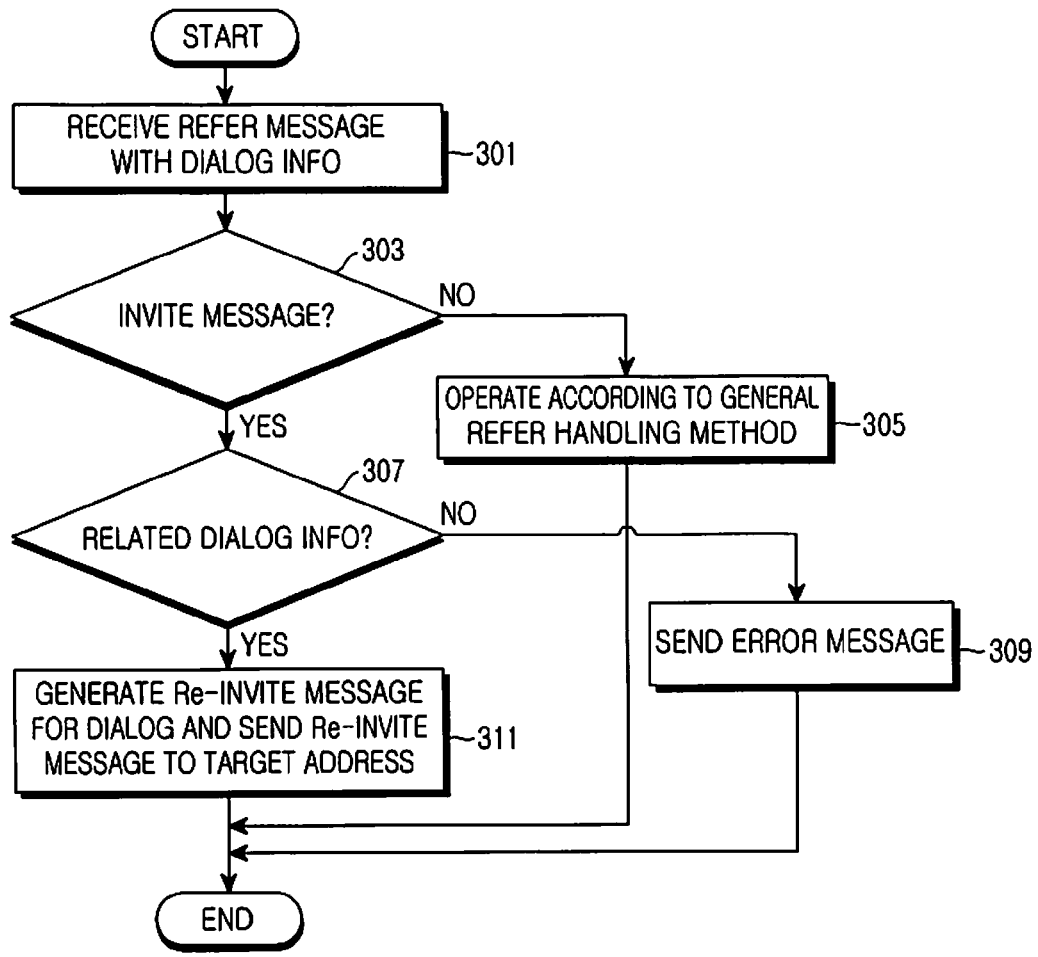
FIG. 3 is a diagram illustrating an operation performed by an SIP entity receiving a REFER message using an extended Refer-To header, according to an embodiment of the present invention.

FIG. 3 is a diagram illustrating an example of an operation performed by an SIP entity receiving a REFER message using an extended Refer-To header, according to an embodiment of the present invention. The Refer-To header includes dialog information (a call-id parameter, a from-tag parameter and a to-tag parameter) using the above-described first and second method for extending a Refer-To header.

Referring to FIG. 3, in step 301, an SIP entity receives a REFER message with an extended Refer-To header that is based on the first or second method for extending a Refer-To header.

In step 303, the SIP entity determines whether an INVITE message will be generated based on the Refer-To header of the received REFER. If it is determined in step 303 that no 'method' parameter is included in the Refer-To header or that a 'method' parameter's value is set as "INVITE message," the SIP entity proceeds to step 307, because an INVITE message will be generated. If it is determined in step 303 that a non-INVITE message will be generated, the SIP entity proceeds to step 305.

In step 305, the SIP entity operates according to a general method of handling a REFER message, without considering the dialog information included in the Refer-To header. More specifically, the SIP entity generates a message requested by the REFER message and sends the generated message to an address indicated by the Refer-To header.

In step 307, the SIP entity determines whether the dialog information included in the Refer-To header is dialog information related to the SIP entity. The SIP entity proceeds to step 309 when non-related dialog information is included, and proceeds to step 311 when related dialog information is included.

In step 309, the SIP entity sends an error message to a sender of the REFER message because the SIP entity cannot generate a Re-INVITE message for the dialog when the dialog information included in the Refer-To header is not the dialog information related to the SIP entity.

In step 311, the SIP entity generates a Re-INVITE message for the dialog and sends the generated Re-INVITE message to an address indicated by the Refer-To header. If the REFER message has SDP parameters in its body, the SIP entity includes the SDP parameters in a body of the Re-INVITE message. If necessary, some of the SDP parameters may be changed or corrected. For example, the SIP entity may input its connection information, when the SDP parameters do not include connection information or include incorrect connection information.

Figure 4:
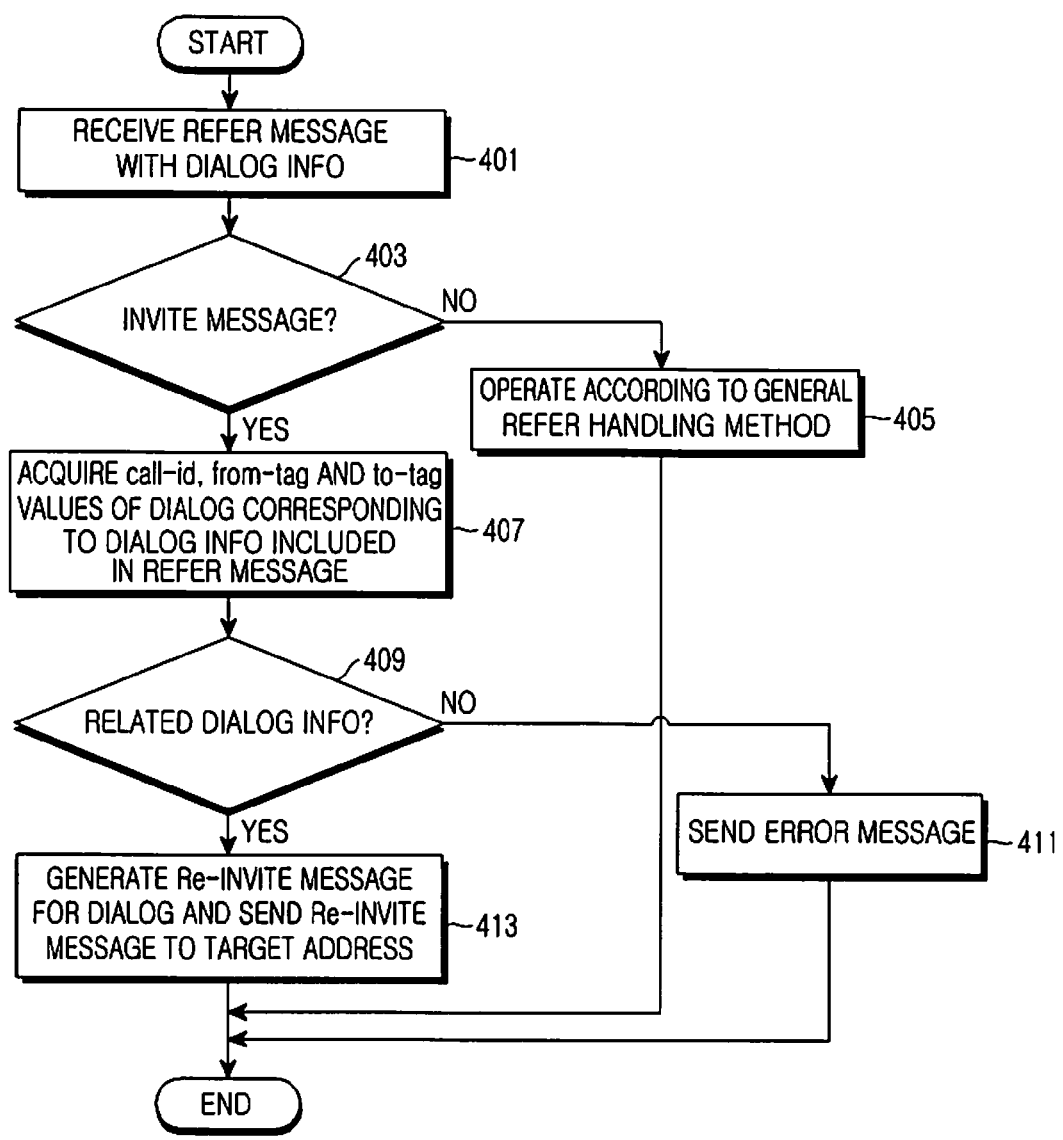
FIG. 4 is a diagram illustrating an operation performed by an SIP entity receiving a REFER message using an extended Refer-To header, according to another embodiment of the present invention.

FIG. 4 is a diagram illustrating operation performed by an SIP entity receiving a REFER message using an extended Refer-To header, according to another embodiment of the present invention. The operation illustrated in FIG. 4 is performed by an SIP entity receiving a REFER message with an extended Refer-To header, in which indirect information on a dialog is included using the above-described third method for extending a Refer-To header.

The operation in FIG. 4 in steps 401, 403, 405, 409, 411 and 413 is similar to that described in steps 301, 303, 305, 307, 309 and 311 FIG. 3. Thus, a detailed description will only be made regarding step 407.

Referring to FIG. 4, in step 407, an SIP entity needs to acquire actual dialog information corresponding to values of dialog parameters. This is due to the fact that dialog information indicated by dialog parameters in a Refer-To header is not the actual information of a dialog, but dialog element IDs in an arbitrary dialog package document. For the information acquisition, the SIP entity sends a request message SUBSCRIBE to the dialog management server 241 requesting a dialog package document. The SIP entity may then read call-id, from-tag and to-tag values from dialog elements in the dialog packet document matched to dialog parameter values included in a Refer-To header. The dialog package document is provided from the dialog management server 241 through a NOTIFY message.

Referring to FIGS. 5 through 8, descriptions are provided below for methods of integrating sessions using an extended Refer-To header that directly represents dialog information according to first and third embodiments of the present invention, and methods for integrating sessions using an extended Refer-To header that represents dialog information indirectly according to second and fourth embodiments of the present invention.

Figure 5:
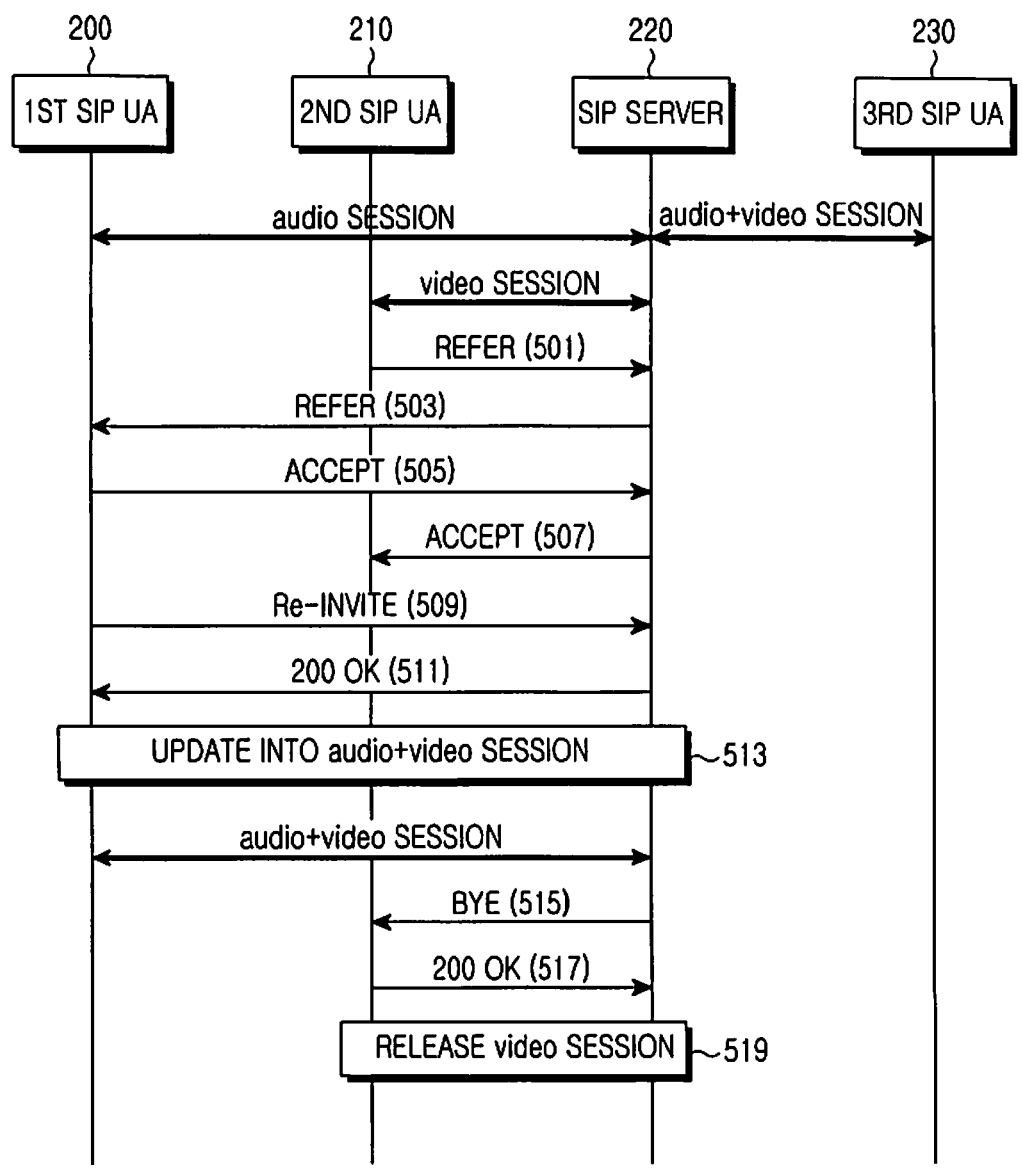
FIG. 5 is a diagram illustrating a process of integrating sessions at the request of a second SIP UA in a network environment, according to a first embodiment of the present invention.

FIG. 5 is a diagram illustrating a process of integrating sessions at the request of a second SIP UA in a network environment, according to a first embodiment of the present invention. The process shown in FIG. 5 is provided to integrate a video session between the second SIP UA 210 and the SIP server 220 into an audio session between the first SIP UA 200 and the SIP server 220 at the request of the second SIP UA 210.

In FIG. 5, the second SIP UA 210 sends a REFER message to the SIP server 220 in step 501 to request session integration. The REFER message has an extended Refer-To header to include direct dialog information, according to the first or second method for extending the Refer-To header as shown in Tables 1 and 2.

The SIP server 220 forwards the received REFER message to the first SIP UA 200 in step 503. Dialog parameters in the Refer-To header include direct dialog information for the audio session between the first SIP UA 200 and the SIP server 220. The dialog information for the audio session may be acquired by the second SIP UP 210 by subscribing to a dialog event related to a user Address of Record (AOR) of the first SIP UA 200 and receiving a NOTIFY message from the dialog management server 241. The Refer-To header includes a dialog-id of the video session of the second SIP UA 210 because the video session of the second SIP UA 210 should be closed after it is integrated into the audio session of the first SIP UA 200. A Replaces header including a dialog-id of the video session is combined with the Refer-To header using a '?' mechanism. In addition, the Refer-To header includes an address of the SIP server 220 or a session ID for the audio session of the first SIP UA 200, as a recipient's address of an INVITE message generated by a reception entity of the REFER message. A body part of the REFER message includes SDP parameters needed to update the dialog information included in the Refer-To header. More specifically, the body of the REFER message includes SDP parameters needed to update the existing audio session into an audio-video integrated session.

The first SIP UA 200 sends an Accept Response message (hereinafter referred to as an "ACCEPT message") to the SIP server 220 in response to the received REFER message in step 505, and the SIP server 220 delivers the received ACCEPT message to the second SIP UA 210 in step 507.

In step 509, the first SIP UA 200 sends a Re-INVITE message to the SIP server 220 in order to update the audio session established for the SIP server 220 according to the SIP entity's operation described in FIG. 3. The Re-INVITE message, which is for a dialog included in the Refer-To header of the REFER message, includes the call-id, from-tag and to-tag delivered through the Refer-To header. An SDP body part of the Re-INVITE message includes SDP parameters delivered through the body of the REFER message. The first SIP UA 200 includes the Replaces header received through the Refer-To header in the Re-INVITE message because the video session between the second SIP UA 210 and the SIP server 220 should be closed after the audio session is updated into an audio-video integrated session by the Re-INVITE message.

In step 511, upon receipt of and in response to the Re-INVITE message, the SIP server 220 sends a 200 OK message to the first SIP UA 200.

In step 513, if the first SIP UA 200 receives the 200 OK message, the video session between the second SIP UA 210 and the SIP server 220 is integrated into the audio session between the first SIP UA 200 and the SIP server 220 at the request of the second SIP UA 210.

In step 515, the SIP server 220 sends a BYE message to the second SIP UA 210 in order to close the dialog indicated by the Replaces header included in the received Re-INVITE message.

If the second SIP UA 210 sends a 200 OK message to the SIP server 220 in response to the BYE message in step 517, the video session between the second SIP UA 210 and the SIP server 220 is released in step 519.

Figure 6:
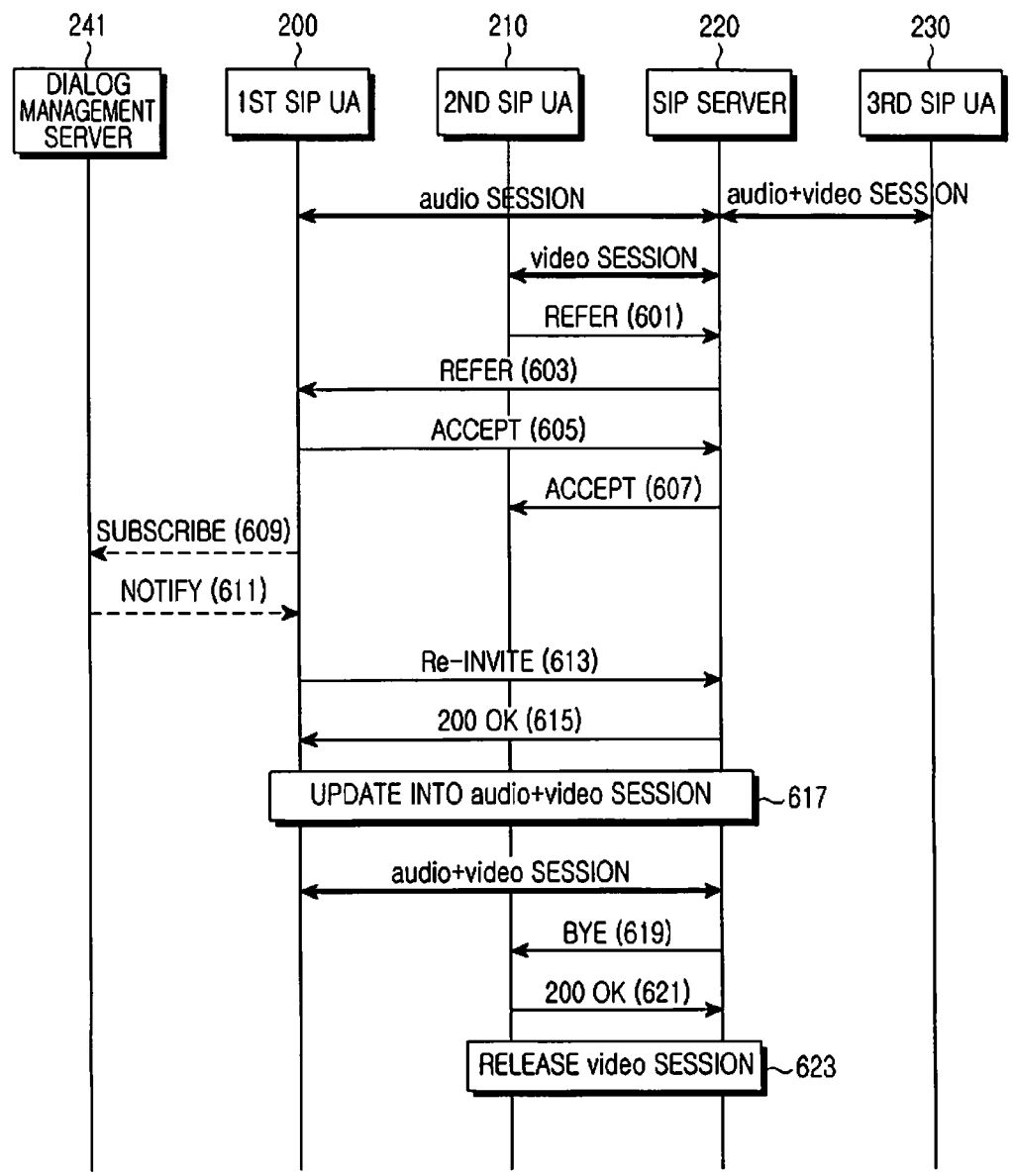
FIG. 6 is a diagram illustrating a process of integrating sessions at the request of a second SIP UA in a network environment, according to a second embodiment of the present invention.

FIG. 6 is a diagram illustrating a process of integrating sessions at the request of a second SIP UA in a network environment, according to a second embodiment of the present invention. The process shown in FIG. 6 integrates a video session between the second SIP UA 210 and the SIP server 220 into an audio session between the first SIP UA 200 and the SIP server 220 at the request of the second SIP UA 210 in the same service environment as that of FIG. 5. However, a Refer-To header of a REFER message in FIG. 6 includes indirect dialog information according to the third method described above in Table 3. Therefore, the first SIP UA 200, which received the REFER message, performs a process (steps 609 and 611) for acquiring indirectly-represented dialog information (call-id, from-tag and to-tag parameters) to generate a Re-INVITE message. Because the process of FIG. 6 is similar to that of FIG. 5 except for the process of acquiring dialog information, only the dialog information acquisition process is described herein.

Steps 601 through 607 of FIG. 6 are similar to steps 501 through 507 of FIG. 5.

In step 609, the first SIP UA 200 sends a SUBSCRIBE message regarding a dialog event to the dialog management server 241. A mutual authentication process between the dialog management server 241 and the first SIP UA 200 may be conducted.

In step 611, if authentication of the SUBSCRIBE message is successful, the dialog management server 241 sends a package document of the requested dialog or package documents of all dialogs the first SIP UA 200 takes part in, to the first SIP UA 200 in a NOTIFY message. Steps 609 and 611 are optional when the first SIP UA 200 can detect the actual dialog information from the dialog information that is indirectly represented in the REFER message. The first SIP UA 200 should be able to detect the actual dialog information (call-id, from-tag and to-tag parameters) from the dialog package document(s) that is acquired through the NOTIFY message in step 611. More specifically, the first SIP UA 200 should be able to select dialog elements corresponding to dialog element IDs received through the Refer-To header from the acquired dialog package documents, and check the dialog information recorded in the selected dialog elements.

Figure 7:
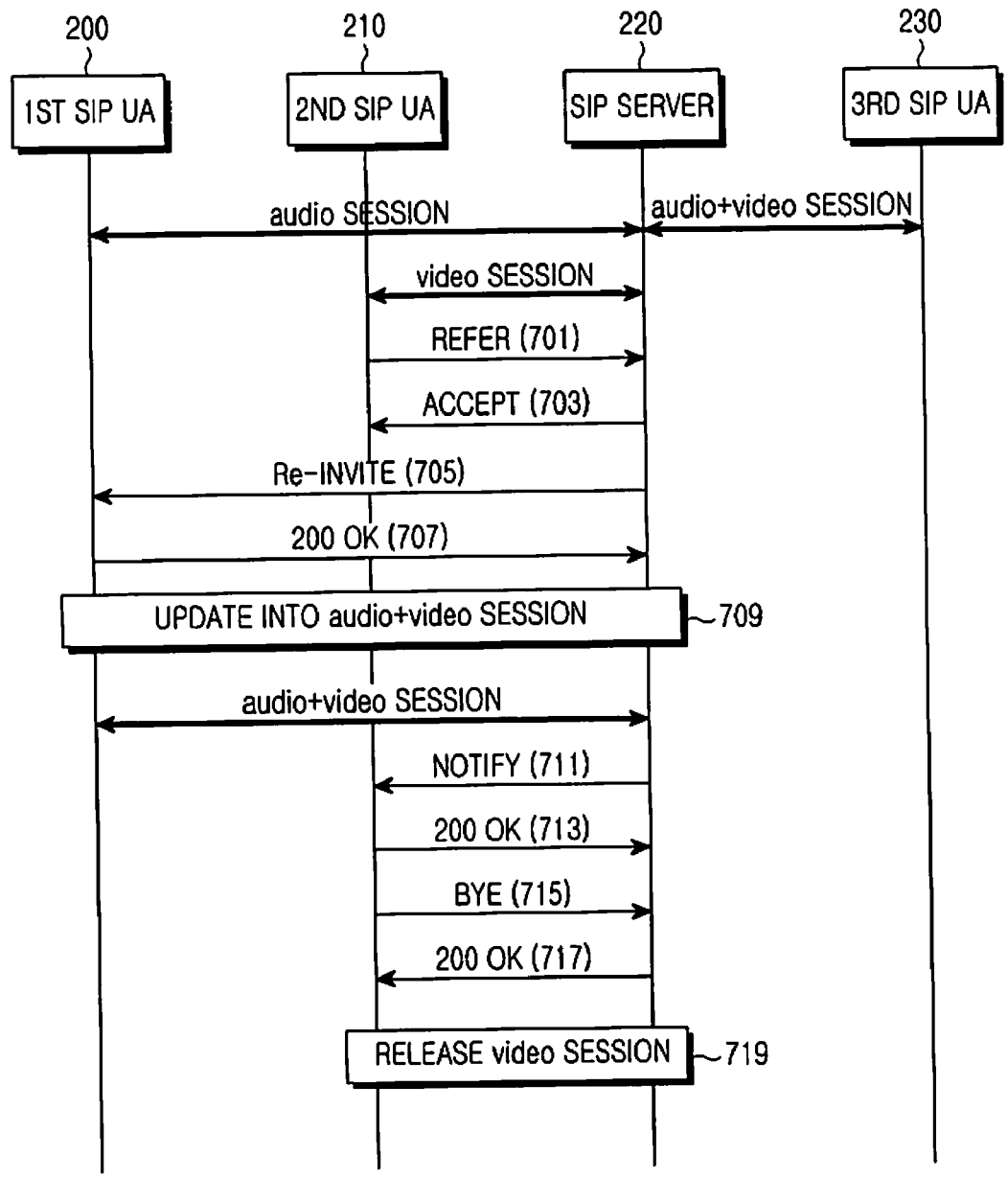
FIG. 7 is a diagram illustrating a process of integrating sessions at the request of a second SIP UA in a network environment, according to a third embodiment of the present invention.

FIG. 7 is a diagram illustrating a process of integrating sessions at the request of a second SIP UA in a network environment, according to a third embodiment of the present invention. The process shown in FIG. 7 integrates a video session between the second SIP UA 210 and the SIP server 220 into an audio session between the first SIP UA 200 and the SIP server 220 at the request of the second SIP UA 210 in the same service environment as that described in FIG. 5.

The session integration process of the third embodiment differs from the session integration process of the first embodiment in that the final reception entity of a REFER message is the SIP server 220.

Referring to FIG. 7, the second SIP UA 210 sends a REFER message to the SIP server 220 in step 701. The REFER message includes direct dialog information for a dialog according to the first or second method for extending a Refer-To header, as shown in Tables 1 and 2. The second SIP UA 210 can acquire dialog information to be represented, by subscribing to a dialog event associated with a user AOR of the first SIP UA 200 and receiving a NOTIFY message from the dialog management server 241. The REFER message includes, in its body, SDP parameters needed to update an audio session into an audio-video integrated session.

In step 703, the SIP server 220 sends an ACCEPT message to the second SIP UA 210 in response to the REFER message.

In step 705, the SIP server 220 generates a Re-INVITE message regarding a dialog represented in the REFER message according to the SIP entity's operation in FIG. 3, and sends the generated Re-INVITE message to the first SIP UA 200. The Re-INVITE message may include, in its body, SDP parameters received through the REFER message.

In step 707, the first SIP UA 200 sends a 200 OK message to the SIP server 220 in response to the Re-INVITE message.

In step 709, if the SIP server 220 receives the 200 OK message, the audio session between the first SIP UA 200 and the SIP server 220 is updated into an audio-video integrated session at the request of the second SIP UA 210.

In step 711, the SIP server 220 sends a NOTIFY message to the second SIP UA 210 in response to the received REFER message. The NOTIFY message notifies the second SIP UA 210 of the completion of the session integration process.

In step 713, the second SIP UA 210 sends a 200 OK message to the SIP server 220 in response to the NOTIFY message.

In step 715, the second SIP UA 210 sends a BYE message to the SIP server 220 to release the video session with the SIP server 220, because the second SIP UA 210 recognizes the completion of the session integration process from the received NOTIFY message.

When the SIP server 220 sends a 200 OK message to the second SIP UA 210 in response to the BYE message in step 717, the video session between the second SIP UA 210 and the SIP server 220 is released in step 719.

Figure 8:
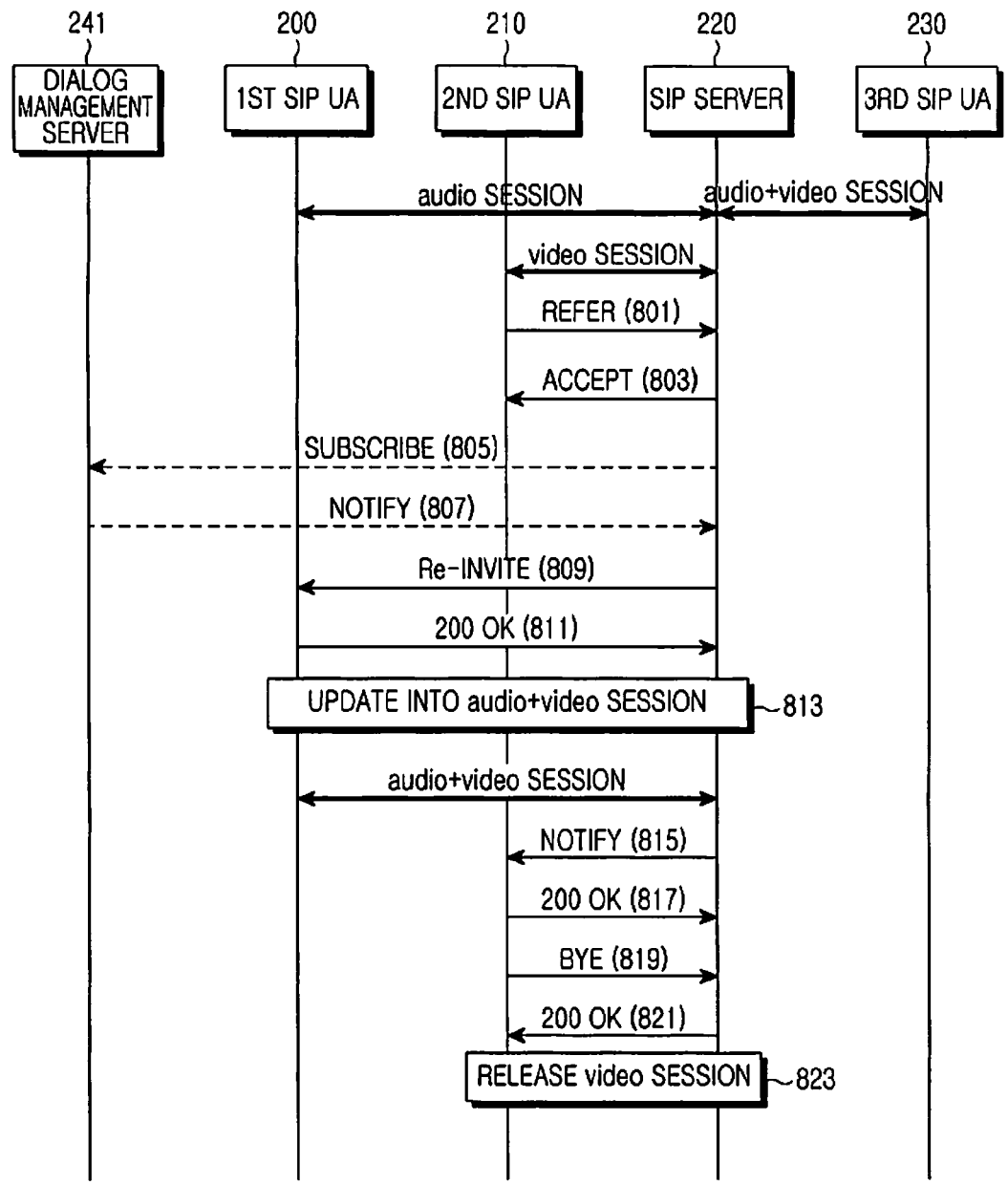
FIG. 8 is a diagram illustrating a process of integrating sessions at the request of a second SIP UA in a network environment, according to a fourth embodiment of the present invention.

FIG. 8 is a diagram illustrating a process of integrating sessions at the request of a second SIP UA in a network environment, according to a fourth embodiment of the present invention. The process shown in FIG. 8 integrates a video session between the second SIP UA 210 and the SIP server 220 into an audio session between the first SIP UA 200 and the SIP server 220 at the request of the second SIP UA 210 in the same service environment as that of FIG. 7. However, a Refer-To header of a REFER message in FIG. 8 includes indirect dialog information for a dialog according to the third method described above in Table 3. Therefore, when the SIP server 220, which received the REFER message, cannot comprehend indirect information for a dialog represented by the REFER message, the SIP server 220 may acquire package documents about a specific dialog or all dialogs that the SIP server 220 takes part in, by sending a SUBSCRIBE message for a dialog event to the dialog management server 241. The session integration process in steps 801, 803, 809, 811, 813, 815, 817, 819, 821 and 823 of FIG. 8 according to the fourth embodiment is similar to the session integration process in steps 710, 703, 705, 707, 709, 711, 713, 715, 717 and 719 of FIG. 7, except for a process of acquiring, by the SIP server 220, call-id, from-tag and to-tag information of a dialog, which is indirectly represented in the REFER message. The acquisition of dialog package documents through SUBSCRIBE and NOTIFY messages, 805 and 807, and acquisition of correct dialog information from the acquired dialog package documents by the SIP server is similar to steps 609 and 611 of the first SIP UA 200 in FIG. 6.

As is apparent from the foregoing description, according to embodiments of the present invention, when an SIP-service user has several SIP UAs, the user can request session integration using a second SIP UA as well as a first SIP UA. This improves user convenience in terms of services. In addition, the technology of generating a Re-INVITE message based on a REFER message, which is a key technology for SIP session control, can be applied to various service fields. In particular, its potential applicability could be much higher in view of the increasing activation of SIP-based services.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A session integration method in a session-based service environment, comprising the steps of:
　receiving, by a first entity joining a first session with a third entity, a REFER message including dialog information that is shared by a second entity joining a second session with the third entity, wherein the first session supports a first media and the second session supports a second media;
　sending, by the first entity, a response message to the received REFER message to the second entity;
　generating, by the first entity, a Re-INVITE message when the received REFER message indicates an INVITE message and the dialog information is related to the first entity;

sending, by the first entity, the generated Re-INVITE message to an address of the third entity which is subject to session integration; and updating, by the first entity, the first session into an integrated session with the third entity, wherein the integrated session supports the first media and the second media.

2. The session integration method of claim 1, wherein the dialog information comprises a call-id parameter, a from-tag parameter and a to-tag parameter.

3. The session integration method of claim 1, wherein the dialog information comprises Identifier (ID) values of dialog elements in a dialog package document that includes a call-id parameter, a from-tag parameter and a to-tag parameter.

4. The session integration method of claim 1, further comprising:

sending, by the first entity, a SUBSCRIBE message requesting a dialog package document to a dialog management server before sending the Re-INVITE message;

receiving, by the first entity, a NOTIFY message including the dialog package document from the dialog management server; and acquiring, by the first entity, the dialog information from the dialog package document in the NOTIFY message.

5. The session integration method of claim 1, wherein the second session is released when the third entity sends a BYE message for closing a dialog indicated by the dialog information to the second entity and receives a response message to the BYE message from the second entity.

6. The session integration method of claim 5, wherein the release of the second session is accomplished when the third entity sends a NOTIFY message indicating completion of the session integration to the second entity and receives a response message to the NOTIFY message from the second entity, before the sending of the BYE message to the second entity.

7. The session integration method of claim 1, further comprising determining whether an INVITE message will be generated.

8. A session integration apparatus of a first entity in a session-based service environment, comprising:

means for receiving a REFER message including dialog information that is shared by a second entity and sending a response message to the received REFER message to the second entity, wherein the first entity joins a first session with a third entity, the second entity joins a second session with the third entity, the first session supports a first media and the second session supports a second media;

means for generating a Re-INVITE message when the received REFER message indicates an INVITE message and the dialog information is related to the first entity and sending the generated Re-INVITE message to an address of the third entity which is subject to session integration; and means for updating the first session into an integrated session with the third entity wherein the integrated session supports the first media and the second media.

9. The session integration apparatus of claim 8, wherein the dialog information comprises a call-id parameter, a from-tag parameter and a to-tag parameter.

10. The session integration apparatus of claim 8, wherein the dialog information comprises Identifier (ID) values of dialog elements in a dialog package document that includes a call-id parameter, a from-tag parameter and a to-tag parameter.

11. The session integration apparatus of claim 8, further comprising means for sending a SUBSCRIBE message requesting a dialog package document to a dialog management server before sending the Re-INVITE message, receiving a NOTIFY message including the dialog package document from the dialog management server, and acquiring the dialog information from the dialog package document.

12. The session integration apparatus of claim 8, wherein the second session is released when the third entity sends a BYE message for closing a dialog indicated by the dialog information to the second entity and receives a response message to the BYE message from the second entity.

13. The session integration apparatus of claim 12, wherein the release of the second session is accomplished when the third entity sends a NOTIFY message indicating completion of the session integration to the second entity and receives a response message to the NOTIFY message from the second entity, before the sending of the BYE message to the second entity.

14. The session integration apparatus of claim 8, further comprising means for determining whether an INVITE message will be generated.

15. A session integration method in a session-based service environment, comprising the steps of:

sending, by a second entity joining a second session with a third entity, a REFER message including dialog information to a first entity joining a first session with the third entity, wherein the first session supports a first media and the second session supports a second media;

receiving, by the second entity, a response message to the REFER message from the first entity through the third entity;

receiving, by the second entity, BYE message for close the dialog second session from the third entity when the first session is updated into an integrated session, wherein the integrated session supports the first media and the second media; and sending, by the second entity, a response message to BYE message to the third entity for release of the second session.

16. The session integration method of claim 15, wherein the release of the second session is accomplished when the second entity receives a NOTIFY message indicating completion of the session integration from the third entity and sends a response message to the NOTIFY message to the third entity, before the receiving of the BYE message from the third entity.

17. The session integration method of claim 15, wherein the header information comprises a call-id parameter, a from-tag parameter and a to-tag parameter as the dialog information.

18. The session integration method of claim 15, wherein the header information comprises Identifier (ID) values of dialog elements in a dialog package document that includes a call-id parameter, a from-tag parameter and a to-tag parameter as the dialog information.

19. The session integration method of claim 15, wherein integrating the second session into the first session by sending a Re-INVITE message from the first entity to the third entity and sending a response message to the Re-INVITE message from the third entity to the first entity when header information included in the REFER message indicates an INVITE message and the dialog information is related to the first entity.

20. A session integration apparatus of a second entity in a session-based service environment, comprising:
   means for sending a REFER message including dialog information to a first entity joining a first session with a third entity, wherein the second entity joins a second session with the third entity, the first session supports a first media and the second session supports a second media, and sending a response message to a BYE message to the third entity for release of the second session; and
   means for receiving a response message to the REFER message from the first entity through the third entity and receiving the BYE message for releasing the second session from the third entity when the first session is updated into an integrated session, wherein the integrated session supports the first media and the second media.

* * * * *